A. J. BOGART.
CLOSET SEAT.
APPLICATION FILED SEPT. 25, 1908.
937,046.
Patented Oct. 19, 1909.
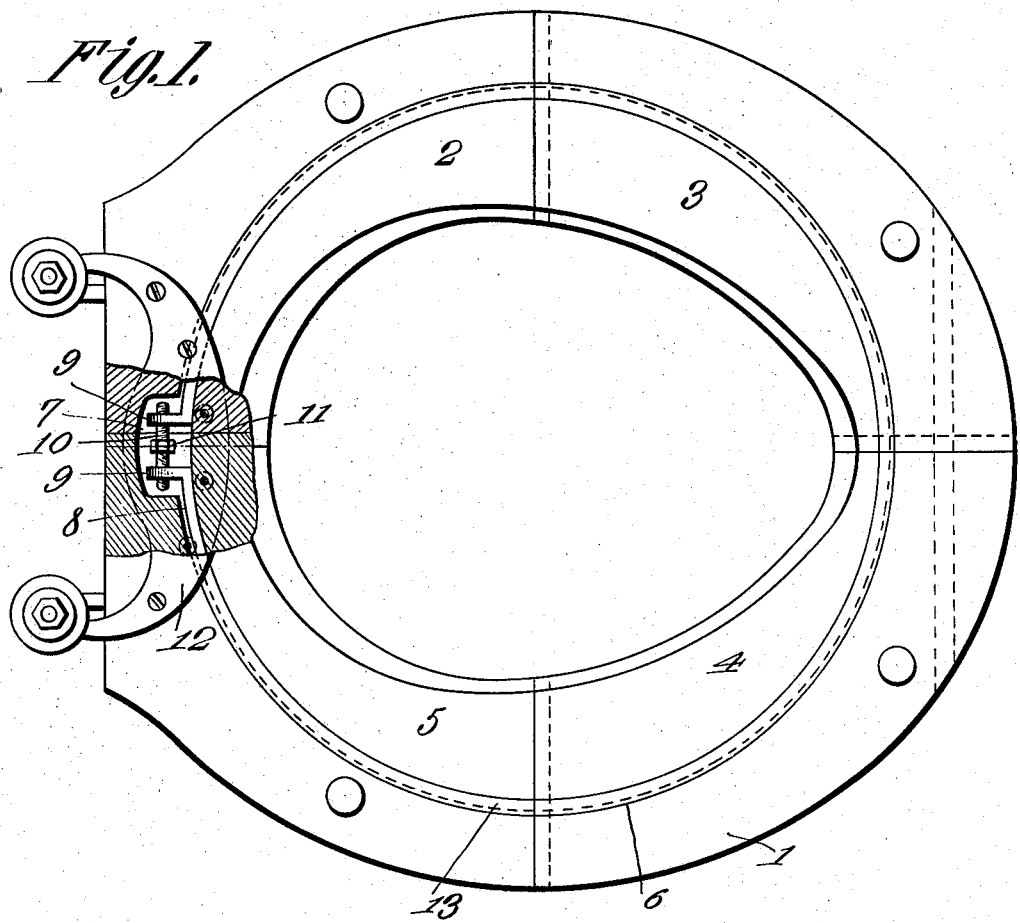
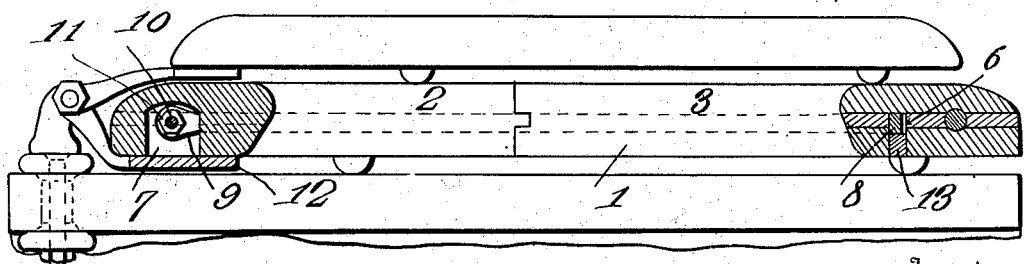
Witnesses
Inventor
Albert J. Bogart
By C. A. Snow & Co.
Attorneys

UNITED STATES PATENT OFFICE.

ALBERT J. BOGART, OF FAR ROCKAWAY, NEW YORK.

CLOSET-SEAT.

937,046.  Specification of Letters Patent.  Patented Oct. 19, 1909.

Application filed September 25, 1908. Serial No. 454,787.

*To all whom it may concern:*

Be it known that I, ALBERT J. BOGART, a citizen of the United States, residing at Far Rockaway, in the county of Queens and State of New York, have invented a new and useful Closet-Seat, of which the following is a specification.

This invention has relation to closet seats and it consists in the novel construction and arrangement of its parts, as hereinafter shown and described.

The object of the invention is to provide a seat which is made up of a series of sections with an adductor or means for securely holding the sections together, and which, at the same time, is so embedded in the seat as to be effectually concealed, and which may be readily reached for the purpose of readjusting the parts of the seat should they become displaced.

With the above object in view the seat is provided upon its under side with a circular groove in which is located an interrupted band or rim, the said rim being preferably of metal. A double end screw-bolt provided with right and left threads, connects the ends of the said band together and is located in a recess which is provided in the under side of the seat, and which is normally closed by the hinge plate upon which the seat is supported. After the said band is properly positioned in the circular groove the lower portion of the groove is closed with a fillet of bent wood, which also serves to strengthen the structure and forms a complete concealing closure for the said groove and its contents.

In the accompanying drawings:—Figure 1 is a plan view of the under side of the seat with part broken away. Fig. 2 is a sectional view of the seat.

The seat 1 is made up of the sections 2, 3, 4 and 5, which are preferably joined together at their ends by tongue and groove joints, and which may also be provided with dowel pins at suitable points, if desired. The seat is provided in its under side with a circular groove 6, which merges at its end into an enlarged recess 7, cut in the meeting portions of the sections 2 and 5 of the structure. By reason of the fact that the said groove 6 is circular it may be readily turned by placing the seat upon a lathe, and thus the said groove may be accurately formed.

The interrupted metal band 8 is located in the groove 6 and provided at its ends with the internally screw-threaded lugs 9. The said lugs 9 are located in the enlarged recess 7. The double-ended screw 10 is provided at its opposite ends with right and left-hand screw-threads which engage the threads of the lugs 9. The said screw is provided at an intermediate point with a non-circular portion 11, upon which a wrench may be placed for the purpose of turning the said screw. The hinge-plate 12 is attached to the under side of the seat 1 and is adapted to close the recess 7 and protect the contents thereof. The fillet 13 is located in the lower portion of the groove 6 and is adapted to close the same and protect the intermediate portion of the rim 8. The said fillet is preferably made of bent wood and adds to the strength of the structure, inasmuch as it is continuous from end to end and passes substantially throughout the length of all the sections of the seat.

From the above description it is obvious that should any of the sections of the seat warp or shrink, or otherwise become distorted or misplaced, the seat may be removed from the hinge-plate 12, when a wrench may be applied to the non-circular portion 11 of the double ended screw 10, which may be turned, whereby the said band may be drawn together at its end, thus serving as an adductor for drawing the sections of the seat close together and in proper relation to each other. Inasmuch as the seat is substantially elliptical or ovate in shape, while the band 13 and the groove 6 are circular, the said groove does not follow in particular lines of the grain of the wood of which the seat sections are composed, and consequently the sections are not weakened and are not liable to split by reason of the fact that they contain the said groove.

As shown in Fig. 1, the sections 2, 3, 4 and 5 have their abutting edges disposed in planes which determine radii of the groove 6. This construction promotes the rigidity of the seat under the action of the adductor ring which is disposed in the groove.

Having described my invention, what I claim as new, and desire to secure by Letters Patent, is:—

1. An annular water-closet seat having a groove in the form of a true circle in its lower face; and an adductor ring mounted in said groove; the seat comprising a plurality of sections having their abutting faces disposed in planes which determine radii of the groove.

2. A closet seat provided in its lower face with an endless groove enlarged to form a recess in the lower face of the seat, the said recess terminating laterally and superiorly within the contour of the seat; an adductor ring mounted in the groove; means disposed in the recess and assembled with the ends of the ring, for contracting the ring; a fillet disposed within and arranged to close the groove; and a hinge plate mounted upon the lower face of the seat and arranged to close the recess.

In testimony that I claim the foregoing as my own, I have hereto affixed my signature in the presence of two witnesses.

ALBERT J. BOGART.

Witnesses:
 VALENTINE W. SMITH,
 GEO. KARSEY.